United States Patent [19]

Weitemeyer et al.

[11] Patent Number: 4,963,438

[45] Date of Patent: Oct. 16, 1990

[54] COATING COMPOSITION AND METHOD FOR COATING SHEET-LIKE SUPPORTS BY APPLYING CURABLE ORGANOPOLYSILOXANES MODIFIED WITH (METH) ACRYLATE ESTER GROUPS

[75] Inventors: Christian Weitemeyer, Essen; Dietmar Wewers, Bottrop; Juergen Jachmann, Herne, all of Fed. Rep. of Germany

[73] Assignee: Th. Goldschmidt AG, Essen, Fed. Rep. of Germany

[21] Appl. No.: 316,239

[22] Filed: Feb. 27, 1989

[30] Foreign Application Priority Data

Mar. 25, 1988 [DE] Fed. Rep. of Germany ....... 3810140

[51] Int. Cl.$^5$ ................................................ B32B 9/04
[52] U.S. Cl. .................................... 428/447; 427/541;
427/35; 427/36; 427/44; 522/99; 525/479;
528/26; 428/449; 428/537.5
[58] Field of Search .......................... 528/26; 525/479;
522/99; 427/54.1, 35, 36, 44; 428/447, 537.5

[56] References Cited

U.S. PATENT DOCUMENTS

| | | | |
|---|---|---|---|
| 4,306,050 | 12/1981 | Koerner et al. | 528/26 |
| 4,568,566 | 2/1986 | Tolentino | 427/54.1 |
| 4,678,846 | 7/1989 | Weitemeyer et al. | 525/477 |

FOREIGN PATENT DOCUMENTS

| | | |
|---|---|---|
| 0152179 | 5/1985 | European Pat. Off. . |
| 0159683 | 10/1985 | European Pat. Off. . |
| 0169592 | 1/1986 | European Pat. Off. . |
| 2335118 | 2/1978 | Fed. Rep. of Germany . |
| 3044237 | 9/1981 | Fed. Rep. of Germany . |

Primary Examiner—Melvyn I. Marquis
Attorney, Agent, or Firm—Toren, McGeady & Associates

[57] ABSTRACT

A method is disclosed for coating sheet-like supports by applying curable organopolysiloxanes, which have been modified with (meth)-acrylate ester groups, on the surface of the support and curing the modified organopolysiloxanes by the action of polymerizing high-energy radiation. Polysiloxanes with hydroxy-functional groups are employed for this purpose, which are obtained by reaction with, based on the hydroxyl groups, 0.4 to 0.9 molar amounts of (meth)acrylic acid and up to 0.6 molar amounts of monocarboxylic acids, which are free of double bonds (sum of the acids $\leq$ 1 molar).

11 Claims, No Drawings

COATING COMPOSITION AND METHOD FOR COATING SHEET-LIKE SUPPORTS BY APPLYING CURABLE ORGANOPOLYSILOXANES MODIFIED WITH (METH) ACRYLATE ESTER GROUPS

FIELD OF INVENTION

The invention is generally concerned with coating procedures and is particularly directed to a method for coating sheet-like supports by applying curable organopolysiloxanes, modified with (meth)acrylate ester groups to the surface of the support and curing the modified organopolysiloxanes by the action of polymerizing high-energy radiation. The term, "(meth)acrylate ester group", embraces acrylate ester groups as well as methacrylate ester groups.

Considered from another aspect, the invention discloses novel coating compositions.

BACKGROUND INFORMATION AND PRIOR ART

Adhesive coating compositions are used on a large scale, especially for coating sheet-like materials in order to decrease the tendency of adhesive products to adhere to these surfaces. Adhesive coating compositions are used, for example, to coat papers or films, which are to serve as supports for pressure-sensitive labels. The labels, provided with a pressure-sensitive adhesive, adhere to the coated surface to a still sufficient extent, to make it possible to handle the support films with the pressure-sensitive labels. It must, however, be possible to pull the labels from the coated support film without significantly affecting their adhesiveness for later use. Other possible applications for adhesive coating compositions are wrapping papers, especially for packaging adhesive goods. Such adhesive papers or films are used, for example, to package foods or technical products such as bitumen.

Such organopolysiloxanes, modified with (meth)acrylate ester groups, are also used to coat printed circuit boards equipped with electronic components. For this application, they serve especially as protection against mechanical effects and corrosive gases or vapors.

The German Patent No. 2,948,708 discloses a method for producing organopolysiloxanes, which are modified with pentaerythritol triacylate or pentaerythritol trimethacrylate esters, from organochloropolysiloxanes, optionally with addition of HCl-binding neutralizing agents. In this patent, organopolysiloxanes of the formula

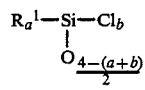

(R$^1$ is alkyl with 1 to 4 carbon atoms, vinyl and/or phenyl, with the proviso that at least 90 mole percent of the R$^1$ groups are methyl; a is 1.8 to 2.2, b is 0.004 to 0.5) are first reacted with, based on the SiCl groups, at least 2 molar amounts of a dialkylamine, the alkyl groups of which in each case have 3 to 5 carbon atoms, the carbon atoms adjacent to the nitrogen having at most one hydrogen atom each. The reaction product is allowed to react with at least equimolar amounts of pentaerythritol triacrylate or pentaerythritol methacrylate and the end product is then separated from solid components suspended in it by known means.

A coating composition prepared by this method exhibits good adhesive properties. Adhesive tapes in contact with the coating composition largely retain their adhesiveness towards untreated substrates. It has, however, been ascertained that the property of adhesiveness must always be considered and evaluated in connection with the chemical constitution and structure of the adhesive, towards which the coating agent is to show adhesive properties. The adhesive coating material disclosed in the German Patent No. 2,948,708 therefore does not provide satisfactory results in all cases, since its properties cannot be adapted to the different adhesives.

Improved properties are shown by (meth)acrylate ester-modified organopolysiloxane mixtures, which are characterized in that they consist of an equilibrated organopolysiloxane with, on the average, >25 to <200 silicon atoms and 2 to 30% by weight of organopolysiloxanes with, on the average, 2 to 25 silicon atoms and 2 to 30% by weight organopolysiloxanes with, on the average, 200 to 2,000 silicon atoms. The organopolysiloxanes, contained in this ternary mixture, have different tasks. The low molecular weight fraction essentially has the task of assuring that the coating composition adheres to the substrate. The high molecular weight fraction, on the other hand, serves primarily the purpose to attain the desired adhesiveness of the coating composition. The middle fraction is the curable matrix, which is responsible especially for the physical properties of the coating composition. Those skilled in the art will understand that this is only a simplified description of the properties and tasks of the three different fractions, since the complex properties, which an adhesive coating material must have, can only be obtained by the united efforts of the three components. With the modified organopolysiloxane mixture of the German Patent No. 3,426,087, it has become possible to improve, on the one hand, the adhesive properties of the mixture towards adhesive surface and, on the other, the adhesive properties towards the substrate, on which the coating material is applied and on which it is cured. However, even with this coating mass it has turned out that the properties cannot be adapted adequately to the different adhesives.

In the European Offenlegungsschrift No. 0 159 683, electron beam-curable liquid coating materials are described, which should contain:

1. 60 to 95 parts of an organopolysiloxane with more than about 25 siloxane groups per molecule and 2 to 10 parts of reacted carbinol groups per molecule, the rest of the substituents on the silicon being hydrocarbon groups with 1 to 20 carbon atoms; the term reacted carbinol groups is understood to mean esters of acrylic acid, methacrylic acid or mixtures or ethers of a hydroxyalkyl ester of these acids, the alkyl group containing 2 to 4 carbon atoms; essentially, unreacted carbinol groups should no longer be present, so that the hydroxyl number is <10.

2. 3 to 25 parts of a polyester of a multihydric alcohol with acrylic acid, methacrylic acid or mixtures thereof, the multihydric alcohol having 2 to 4 hydroxyl groups per molecule and a molecular weight of <1,200;

3. 1 to 10 parts of acrylic acid, methacrylic acid or mixtures of these acids.

The additional use of the (meth)acrylate ester of a polyalcohol increases the curing rate, but has a disadvantageous effect on the flexibility and adhesiveness of the coating material as a result of the increase in the organic portion. The content of free acrylic or methacrylic acid is an additional disadvantage, which leads to an annoying odor and makes the processing difficult during the application on the material to be coated.

Because they can be cured by radiation, organopolysiloxanes with acrylate ester groups have been described for a series of other possible applications. Organopolysiloxanes, modified with acrylate ester groups, are thus used as coating lacquers that are to be poured into and around electrical and electronic components and also for the manufacture of molded objects. The following Offenlegungsschriften, Auslegeschriften and patents are cited with regard to the possible structures of such acrylate ester group-modified polysiloxanes:

The German Auslegeschrift No. 2,335,118 relates to optionally substituted acrylate group-containing organopolysiloxanes of the general formula

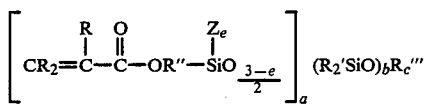

(R=hydrogen or univalent hydrocarbon groups with 1 to 12 carbon atoms; R'=univalent, optionally halogenated hydrocarbon groups or cyanoalkyl groups with 1 to 8 carbon atoms; R''=divalent hydrocarbon groups with 1 to 18 carbon atoms or C—O—C bonds-containing divalent hydrocarbon groups; R'''=R''''O$_{0.5}$ or R'$_3$SiO$_{0.5}$; Z=OR'''', R'''' or OSiR'$_3$; R''''=alkyl group with 1 to 12 carbon atoms; a and b each represent numbers from 1 to 20,000; c is a number from 0 to 3; e is a number from 0 to 2; at least one of the Z groups is OR'''' when c=0). The siloxane polymers can be used as intermediates in the synthesis of copolymers, which contain organopolysiloxane segments and find use as coating compositions. Moreover, these acrylate-functional siloxane polymers can serve as sizes and protective coating compositions for paper and fabric. However, these products are unsuitable for the preparation of adhesive coating materials. Furthermore, the linear, diacrylate-modified polysiloxanes of the German Auslegeschrift No. 2,335,118 by definition have alkoxy groups, which can be split off hydrolytically and lead to further cross linking of the polysiloxanes with a deterioration of the elastic properties, which are important for a coating composition.

The German Offenlegungsschrift No. 3,044,237 discloses polysiloxanes with lateral acrylate ester groups, which can be synthesized by the reaction of epoxy-functional siloxanes of a particular structure with acrylic acid. The products obtained are curable by radiation. They can be used as low-viscosity lacquers for application via conventional oil-based printing inks. As adhesive coatings compositions, the products can be used only with considerable limitations, since there is a hydroxyl group for each acrylate ester group.

In the U.S. Pat. No. 4,568,566, curable silicone preparations are described, which comprise:

(a) 75 to 100 mole percent of chemically bound siloxy units of the formula R$_3$SiO$_{0.5}$, RSiO$_{1.5}$ and SiO$_2$, as well as (b) 0 to 25 mole percent of R$_2$SiO units, a number of the R units having the formula

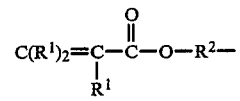

wherein R$^1$ is a hydrogen group or a hydrocarbon group with 1 to 12 carbon atoms and R$^2$ is a divalent hydrocarbon group or an oxyalkylene group. These curable preparations are used especially for coating electronic components and as a coating material for optical fibers. Because the content of R$_2$SiO units is too low, they are not suitable as adhesive coating materials for sheet-like supports.

The object of the European Offenlegungsschrift No. 0 152 179 is a silicone preparation, which can be cured into an elastomer. This preparation comprises (a) a silicone resin with linear structure and, on the average, at least 150 siloxane units, as well as terminally linked acrylic acid groups, the region in between the terminal groups being free of acrylic acid groups; (b) at least 10% of finely divided silica and (c) a photoinitiator. These materials are to be used as adhesives and as casting compositions.

Finally, reference is made to the European Offenlegungsschrift No. 0 169 592, which relates to an optical glass fiber with a synthetic resin covering, with a glass fiber and an enveloping layer of artificial rubber with a refractive index, which is higher than that of the outer layer of the glass fiber, the artificial rubber being formed from a curable synthetic resin composition, which has a copolymer that contains, as monomeric units, dimethylsiloxane and at least one siloxane from the group comprising methylphenylsiloxane and diphenylsiloxane. The siloxane copolymer contains at least two acrylate ester groups per molecule. As a distinguishing feature, the curable synthetic resin composition additionally contains a polyurethane acrylate with an average molecular weight of 3,000. The polysiloxane named in the claim may have the following formula:

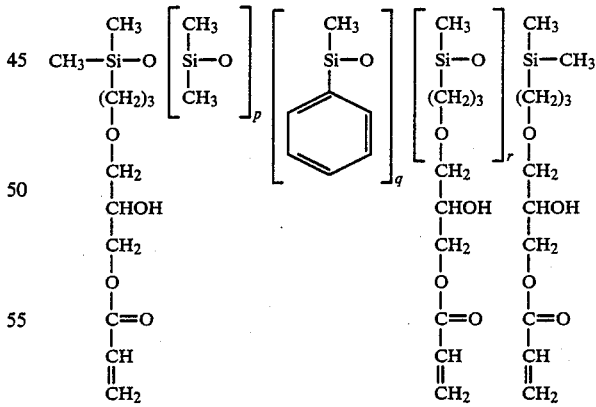

It is an essential conditions that these polysiloxanes have phenyl groups linked to silicon. The phenyl group content is necessary in order to approximate the refractive index of the coating composition to that of the glass optical fiber. From the use of these siloxanes in combination with a polyurethane acrylate for coating optical glass fibers, it cannot be concluded that such compounds can possibly also be used as adhesive compositions.

In the journal "Makromolekulare Chemie" (Macromolecular Chemistry, Rapid Communication), 7, (1986), pages 703 to 707, the synthesis of linear methylpolysiloxanes with terminal methacrylate ester groups is described. For this reaction, an allyl epoxypropyl ether first of all undergoes an addition reaction with α,ω-hydrogendimethylpolysiloxane in the presence of chloroplatinic acid. The diepoxide formed is subsequently reacted with methacrylic acid in the presence of chromium diisopropyl salicylate to form the desired methacrylate esters. These esters may be present in two isomeric forms:

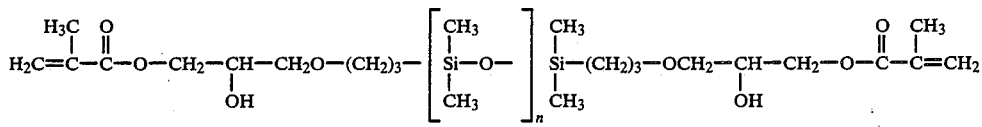

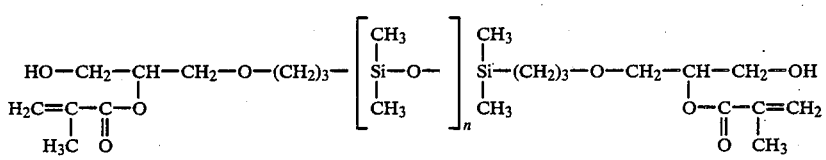

(α-isomer)

(β-isomer)

If the (meth)acrylate esters are prepared by methods of the state of the art starting out with epoxy-functional siloxanes, the epoxy groups are reacted with (meth)acrylic acid. In this reaction, (meth)acrylate monoesters with a vicinal hydroxyl group are formed by opening the epoxide ring.

OBJECTS OF THE INVENTION

It is an object of the invention to provide adhesive coating compositions based on (meth)acrylate ester-modified organopolysiloxanes, the properties of which are improved if compared with those of the coating compositions known from the art.

More particularly, it is an object of the invention to provide coating compositions, which can be adapted to differently adhering products (adhesives).

The desired organopolysiloxanes modified with (meth)acrylate ester groups should have especially the following combination of properties:

1. satisfactory adhesion to the particular support that is to be coated
2. a high rate of curing on the support or substrate
3. chemical and physical stability of the cured coating
4. high flexibility of the cured coating
5. adhesive properties towards adhesive products and adaptability of the adhesive coating to the chemical character of the adhesive
6. adjustability of the desired degree of adhesiveness.

The modified organopolysiloxanes should, moreover, be suitable for coating electronically equipped printed circuit boards and similar electronic components.

SUMMARY OF THE INVENTION

The inventive method is characterized in that curable organopolysiloxanes are used, which are obtained by the reaction of polysiloxanes of the general average formula wherein
the $R^1$ groups are the same or different and represent low molecular weight alkyl groups with 1 to 4 carbon atoms or phenyl groups,
the $R^2$ groups are
(a) hydroxy-functional groups of the formula $-CH_2(CR^3{}_2)_n-(OCH_2CHR^4)_m-OH$, $-CH=CH-CR^3{}_2-OH$ and/or groups of the formula

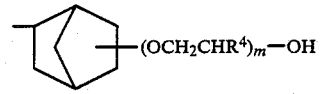

wherein the $R^3$ groups are the same or different and represent a hydrogen group or an alkyl group with 1 to 4 carbon atoms, the $R^4$ groups are the same or different and in each case represent a hydrogen or alkyl group with 1 to 10 carbon atoms, and the subscripts $n=0$ to 10 and $m=0$ to 40 and
(b) unsubstituted or substituted alkyl groups with 2 to 20 carbon atoms and/or hydrogen groups and
(c) $R^1$ groups with the proviso that at least 1.8 hydroxy functional $R^2$ groups (a) are contained in the average molecule a has a value of 1 to 1,000 and b a value of 0 to 10, with, based on hydroxyl groups, 0.4 to 0.9 molar amounts of (meth)acrylic acid and up to 0.6 molar amounts of a monocarboxylic acid, which is free of double bonds capable of polymerizing, the sum of the molar amounts of the acids being not greater than 1.0. The reaction is carried out under the usual esterification conditions.

It is essential that at least 1.8 hydroxy-functional $R^2$ groups (a) are present in the average molecule, although greater amounts may be present. As a matter of fact, all $R^2$ groups may be hydroxy-functional. However, once the condition is satisfied that 1.8 hydroxy-functional $R^2$ groups of the species (a) are present, the remainder of the $R^2$ groups may be of the species (b) and/or may be $R^1$ groups. If $R^2$ groups of the species (b) are present, the further condition applies that the lower limit value of the ratio between the hydroxy-functional $R^2$ groups (a) and the $R^2$ groups of species (b) must not be below 70:30.

The general formula I is the average formula of the hydroxy-functional organopolysiloxanes required for the reaction. The individual building blocks are distributed randomly (statistically) in the polymer mixture.

The sum of the functional $[R^1R^2SiO-]$ units is $2a+b \times a$. The number of trifunctional $[R^1SiO_{3/2}-]$ units is given by the subscript b. a has a value of 1 to 1,000 and preferably a value of 5 to 200, while b has a value of 0 to 10 and preferably of 0 to 2. If b is 0, the hydroxy-functional organopolysiloxanes are present in chain form with a linear structure. The structure of the hydroxy-functional organopolysiloxanes defined by the subscripts a and b is retained even after the reaction with the (meth)acrylic acid and the other monocarboxylic acid.

Within the polymeric molecule, $R^1$ may be the same or different and represent a lower alkyl group with 1 to 4 carbon atoms or a phenyl group. The alkyl groups may be linear or branched. Preferably, at least 90% of the $R^1$ groups are methyl groups.

The $R^2$ groups may partly have the meaning of the $R^1$ group. The remaining $R^2$ groups are, to the extent of 70 to 100%, hydroxy-functional groups of the formula $-CH_2(CR^3{}_2)_n-(OCH_2CHR^4)_m-OH$ and/or the formula

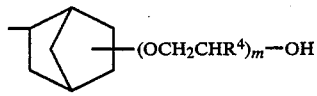

and to the extent of 30 to 0% optionally substituted alkyl groups with 2 to 20 carbon atoms and/or hydrogen groups.

In these groups, $R^3$ is the same or different and represents a hydrogen or an alkyl group with 1 to 4 carbon atoms, the alkyl group preferably being methyl.

$R^4$ is the same or different and represents a hydrogen or alkyl group with 1 to 10 carbon atoms, linear alkyl groups being preferred.

n has a value of 0 to 10, a value of 2 to 10, however, being preferred for reasons of accessibility.

m has a value of 0 to 40; preferably, however, m is equal to zero.

If the meaning of the $R^3$ and $R^4$ groups and the value of the subscripts is inserted in the $-CH_2(CR^3{}_2)_n-(OCH_2CHR^4)_m-OH$ group or the

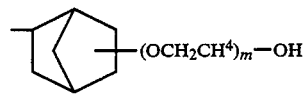

group, it turns out that the moiety $-CH_2(CR^3{}_2)_n$ or the norbornyl group has the meaning of a bridging element, over which the hydroxy-functional group is linked with a silicon atom of the siloxane frame. Preferably, the bridge portion $-CH_2(CR^3{}_2)_n$ has the meaning of $-(CH_2)_3$ or $$-CH_2CH_2CH- \atop {\phantom{xxxx}|\atop CH_3}$$

The portion of the $R^2$ group between the bridging element and the terminal OH groups with the formula of $-(OCH_2CHR^4)_m$ has the meaning of an ether or polyether group. This group may be omitted (m=0).

Preferably, $R^4$ is a hydrogen group or a methyl group. $R^4$ may, however, also have the meaning of a long-chain alkyl group with up to 10 carbon atoms. The alkyl group preferably is not branched.

Preferred hydroxy-functional $R^2$ groups are $-CH_2OH$, $-(CH_2)_3OH$, $-(CH_2)_4OH$, $-(CH_2)_{11}OH$, $-CH_2CH(CH_3)CH_2OH$, $-CH_2CH(CH_3)CH_2CH_2OH$, $-CH_2CH_2C(CH_3)_2OH$, $-CH_2CH_2C(CH_3)HOH$ and $-CH=CH-CH_2OH$.

Up to 30% of the $R^2$ groups can be alkyl groups with 2 to 20 carbon atoms or hydrogen groups. The alkyl groups may optionally be substituted by halogen or phenyl groups. Examples of suitable and preferred $R^2$ alkyl groups are ethyl, propyl, n-butyl, i-butyl, hexyl, octyl, dodecyl, octadecyl, 2-phenylpropyl and 3-chloropropyl groups.

In the selection of the different meanings for the $R^2$ group, the conditions should be noted that at least 1.8 $R^2$ groups in the average molecule are hydroxy-functional groups. The value of 1.8 is to be regarded as a mathematical average value of a mixture of polymers.

It is essential that at least 1.8 hydroxy-functional $R^2$ groups (a) are present in the average molecule, although greater amounts may be present. As a matter of fact, all $R^2$ groups may be hydroxy-functional. However, once the condition is satisfied that 1.8 hydroxy-functional $R^2$ groups of the species (a) are present, the remainder of the $R^2$ groups may be of the species (b) and/or may be $R^1$ groups. If $R^2$ groups of the species (b) are present, the further condition applies that the lower limit value of the ratio between the hydroxy-functional $R^2$ groups (a) and the $R^2$ groups of species (b) must not be below 70:30.

The organopolysiloxanes to be used in the inventive method are obtainable by reacting hydroxy-functional organopolysiloxanes of the general formula I with (meth)acrylic acid and, optionally, additionally a further monocarboxylic acid, which is free of double bonds capable of polymerizing. The expression (meth)acrylic acid is intended to imply that acrylic acid or methacrylic acid or a mixture of the two acids can be used.

It is a vital proviso of the invention that, based on the hydroxyl groups, 0.4 to 0.9 molar amounts of (meth)acrylic acid and up to 0.6 molar amounts of the additional monocarboxylic acid, which is free of double bonds capable of polymerizing, are reacted. Based on the hydroxyl groups, the total molar amount of acids may, however, not exceed 1.0.

Preferably, those polysiloxanes are used, in which all the hydroxyl groups of the polysiloxane are esterified.

Alkyl carboxylic acids and benzoic acids come into consideration as monocarboxylic acids, which are free of double bonds capable of polymerizing. As alkyl carboxylic acids, those with 2 to 11 carbon atoms are preferred. Examples of such monocarboxylic acids are acetic acid, propionic acid, butyric acid, valerianic acid, pivalic acid, 2,2-dimethylbutyric acid, 2,2-dimethylvalerianic acid, acetoacetic acid, isooctanecarboxylic acid, isodecanecarboxylic acid, sorbic acid and undecylenic acid.

An especially preferred monocarboxylic acid is acetic acid.

In the organopolysiloxanes that are to be used in the inventive method, 40 to 90 mole percent of the hydroxy-functional $R^2$ groups are present in the form of their (meth)acrylate esters. Up to 60 mole percent of the hydroxy-functional $R^2$ groups may be present in the form of the monocarboxylate esters that are free of double bonds capable of polymerizing.

Moreover, depending on the proportion of monocarboxylic acid used for the esterification, the hydroxyfunctional groups may be present unchanged. The ratio of the groups derived from the $R^2$ groups with (meth)acrylate ester groups and monocarboxylate ester groups to the unchanged hydroxy-functional $R^2$ groups is a result of the nature and amount of the (meth)acrylic acid/monocarboxylic acid mixture used for the esterification.

By these means, those skilled in the art have at their disposal a method for adjusting in the desired manner the properties of the organopolysiloxanes that are to be used pursuant to the invention:

1. The adhesiveness of the organopolysiloxanes that are to be used pursuant to the invention increases, after they are cured, with the number of (meth)acrylate groups in the polymer molecule. As the cross linking density increases, the glass transition temperature of the cured coating increases and the flexibility of the coating of the coating decreases. At the same time, the chemical and physical stability of the cured coating is increased.

2. As the proportion of monocarboxylate ester groups, which are free of double bonds capable of polymerizing, increases, the adhesiveness decreases and the adhesion to the support improves. This decrease in adhesiveness is reinforced additionally by hydroxyl groups of unreacted, hydroxy-functional $R^2$ groups, which may optionally be present. By these means, the adhesive coating can also be adapted to the chemical character of the adhesive.

The organopolysiloxanes that are to be used in the inventive method are therefore particularly suitable for being adjusted and adapted to the particular application. They are therefore especially suitable as a radiation-curable adhesive coating material or for coating electrical or electronic components.

In the following, examples are given of polysiloxanes, which are to be used pursuant to the invention and have (meth)acrylate ester groups, which are linked over SiC groups, and optionally monocarboxylic ester groups.

Compound 1

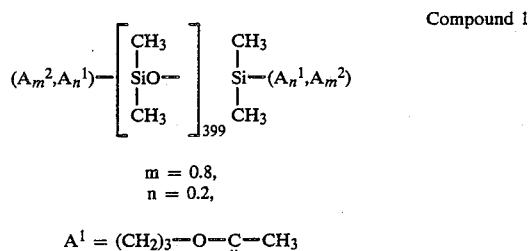

m = 0.8,
n = 0.2,

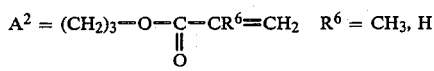

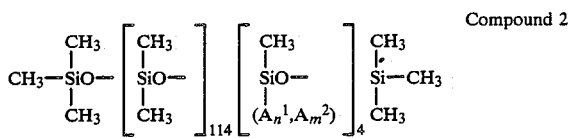

Compound 2

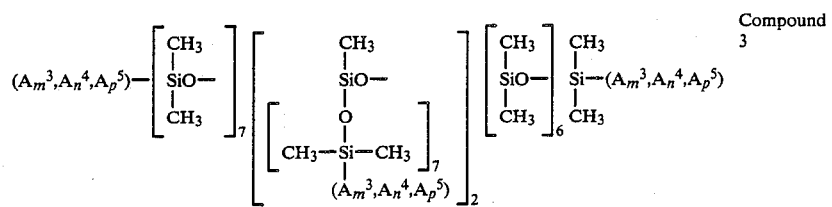

$A^1$, $A^2$, n and m are defined as in compound 1.

Compound 3

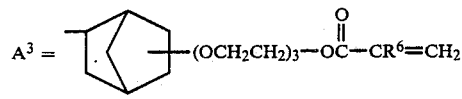

m = 0.8,
n = 0.1,
p = 0.1,

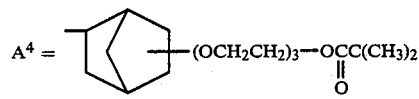

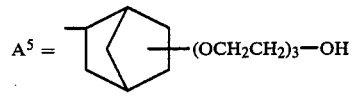

.mt3

-continued

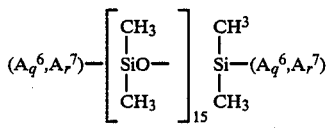

$q = 0.9,$
$r = 0.1,$

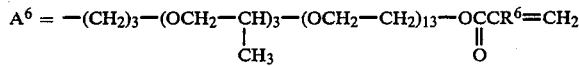

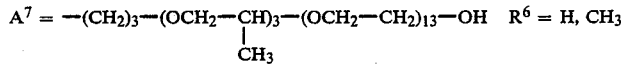

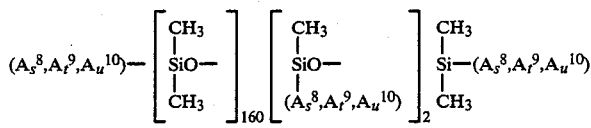

$s = 0.7,$
$t = 0.1,$
$u = 0.2,$

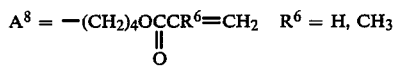

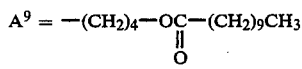

Compound 4

Compound 5

The organopolysiloxanes, which are to be used pursuant to the invention, are synthesized by methods known in the art. For example, for the synthesis of hydroxy-functional organopolysiloxanes of formula I, hydrogenpolysiloxanes can be used, in which $R^1$ represents hydrogen. These hydrogen siloxanes undergo an addition reaction with $R^{2*}$ groups. $R^{2*}$ groups correspond to $R^2$ groups, but have an olefinic double bond at the end that is intended to be linked to the silicon atom. In this reaction unreacted SiH groups may remain in the product, so that the inventive polysiloxanes may contain small amounts of hydrogen groups as $R^2$ groups. The hydroxyl groups of the hydroxy-functional polysiloxanes of formula I are esterified with (meth)acrylic acid and the additional monocarboxylic acid by a procedure that is known. This is understood to mean that the esterification is preferably carried out at temperatures of 80° to 150° C., optionally in the presence of a solvent. Advisably, the solvent should form an azeotrope with the water set free during the esterification. It is recommended that an esterification catalyst such as sulfuric acid, sulfonic acid or metal salts be added to the reaction mixture.

If necessary, known polymerization inhibitors, such as hydroquinone, can be added in effective amounts during the esterification to prevent premature polymerization.

The modified organopolysiloxanes can be used directly as such for the inventive method. Only in the case of UV curing is it necessary to add free radical initiators to the modified polysiloxanes in amounts of 2 to 5% by weight, based on the siloxane.

The selection of the free radical starter should be based on the wavelength spectrum of the radiation source used for the curing. Such free radical initiators are known. Examples of such free radical initiators are benzophenone, its oximes or benzoin ethers.

It is possible to modify the coating comopositions, so obtained, in a known manner by the addition of further products.

Such known modifying agents are siloxanes with groups, which are incorporated chemically into the coating composition, as the latter is cured. Especially suitable modifying agents are siloxanes with hydrogen atoms linked to silicon atoms. One of the effects that such modifying agents can produce is a lowering of the viscosity of the coating composition, as a result of which the applicability on the sheet-like carrier is improved.

It is furthermore possible to add additives to the coating materials. These additives are then enclosed as inert substances by the coating composition during the curing process. Examples of such substances distributed in the coating composition are highly disperse silica or polymers of fluorinated hydrocarbons.

In the following examples, the preparation of the modified polysiloxanes to be used in the inventive method and their application properties are described.

EXAMPLE 1

To 116 g (2 moles) allyl alcohol, 200 g toluene and 40 mL of a solution of 4 mg $H_2PtCl_6.6 H_2O$ in 3 mL glycol dimethyl ether in a 4 L 3-neck flask, 1170 g (1 mole) of an SiH group-containing polydimethylsiloxane of the average formula

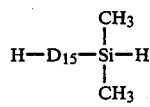

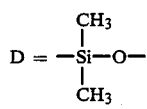

is added dropwise at 100° C. After 8 hours at 100° C., 116 g (1.6 moles) acrylic acid, 24 g (0.4 moles) acetic acid, 0.3 g methylhydroquinone, 2.5 g of 98% sulfuric acid and 200 g of toluene are added at 30° C. to the hydroxy-functional polydimethylsiloxane of average formula

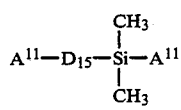

$A^{11} = -(CH_2)_3-OH$ so obtained. The reaction mixture is subsequently heated to the boiling point and the resulting reaction water is distilled off azeotropically. After 15 hours, the theoretical amount of water of 36 g has been distilled over. The excess acid is neutralized with NaHCO$_3$. After distillation (100° C., 40 mbar) and filtration, 1320 g (95% of the theoretical amount) of an oil of medium viscosity are obtained which, according to the $^1$H—NMR spectrum has the general formula $(A_m^2,A_n^1)-D_{15}-\underset{\underset{CH_3}{|}}{\overset{\overset{CH_3}{|}}{Si}}-(A_n^1,A_m^2)$ $A^1$ and $A^2$ are defined as for Compound 1 ($R^6$=H)
m=0.8
n=0.2

EXAMPLE 2

As in Example 1, 11.6 g (0.2 moles) allyl alcohol and 441.9 g (0.05 moles) of an SiH group-containing polydimethylsiloxane of the average formula

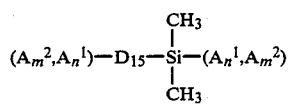

are reacted to form a hydroxy-functional polydimethylsiloxane of the average formula

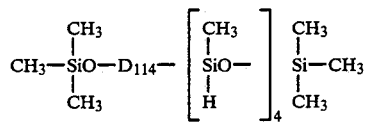

$A^{11} = -(CH_2)_3-OH$

Subsequently, the polydimethylsiloxane obtained is esterified with 11.6 g (0.16 moles) acrylic acid and 2.4 g (40 mmoles) acetic acid. After 30 hours, the reaction mixture is neutralized, filtered and distilled, 431 g (93% of the theoretical amount) of a moderately viscous oil of average formula

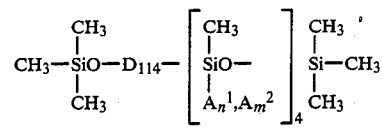

being obtained, wherein
$A^1$, $A^2$ are as defined in Compound 1 ($R^6$=H)
n=0.8
m=0.2.

EXAMPLE 3

To a mixture of 96.8 g (0.4 moles) of an ethoxylated norborneol having the average formula

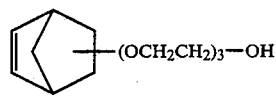

100 g toluene and 8 mL catalyst solution, 200 g (0.1 mole) of an SiH group-containing polydimethylsiloxane of the average formula

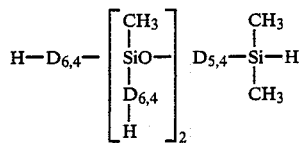

are added dropwise as in Example 1. After 7 hours at 100° C., the reaction mixture is cooled to room temperature and 100 g toluene, 2.9 g (40 mmoles) propionic acid, 23.1 g (320 mmoles) acrylic acid and 0.8 g of 98% sulfuric acid are added. The temperature is subsequently raised to the boiling point and the reaction water is distilled off azeotropically. After 24 hours and a similar working up, 310 g (96%) of an oil of the average formula

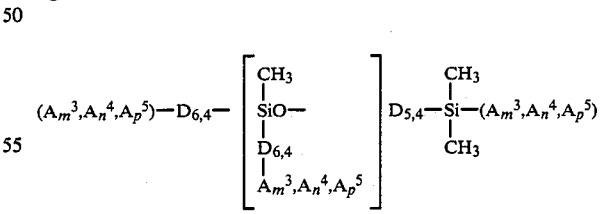

are obtained, wherein
$A^3$, $A^4$, $A^5$ are defined as in Compound 3 ($R^6$=H)
m=0.8
n=0.1
p=0.1

EXAMPLE 4

From 1447 g (1.8 moles) of a polyether of the general formula

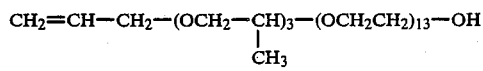

26.3 g (0.2 moles) α-methylstyrene and 1170 g (1 mole) of an SiH group-containing polydimethylsiloxane having the average formula

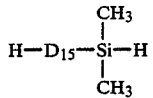

a hydroxy-functional polydimethylsiloxane having the average formula

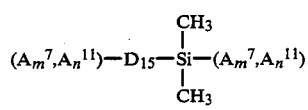

is prepared as in Example 1, wherein
$A^7$ is defined as in compound 4

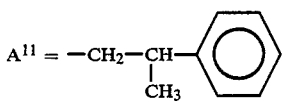

m = 0.9
n = 0.1

The product is esterified with 116 g (1.6 moles) of acrylic acid as in Example 1. After 30 hours and a similar working up, 2591 g (95% of the theoretical amount) of a red-brown oil are obtained, which according to the $^1$H—NMR spectrum has the average formula

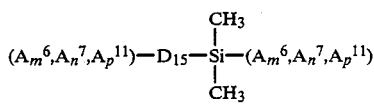

wherein
$A^6$, $A^7$ are defined as in compound 4 ($R^6$=H)

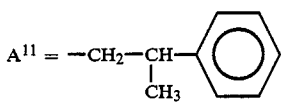

m = 0.8
n = 0.1
p = 0.1

EXAMPLE 5

From 14.0 g (0.24 moles) allyl alcohol, 5.0 g (0.06 moles) 1-hexene and 440.5 g (0.05 moles) of an SiH group-containing polydimethylsiloxane having the average formula

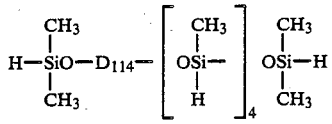

a hydroxy-functional polydimethylsiloxane having the average formula

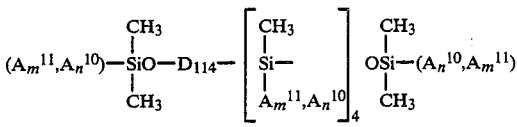

wherein
$A^{10}$ = —(CH$_2$)$_5$—CH$_3$,
$A^{11}$ = —(CH$_2$)$_3$—OH,
m = 0.2
n = 0.8
is prepared as in Example 1.

The polydimethylsiloxane obtained is subsequently esterified with 13.0 g (0.18 moles) acrylic acid and 11.0 g (0.06 moles) undecylenic acid. After 34 hours, the reaction mixture is neutralized, filtered and distilled, 465 g (98% of the theoretical amount) of a moderately viscous oil being obtained, which according to the $^1$H—NMR spectrum has the average formula

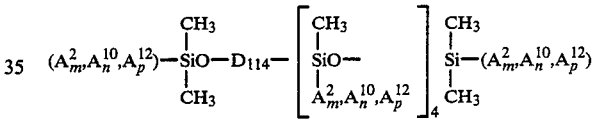

wherein
$A^2$ is defined as in Compound 1 ($R^6$=H)
$A^{10}$ is defined as in Compound 5

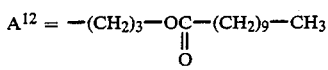

m = 0.7
n = 0.2
p = 0.1

TESTING THE APPLICATION

To check the application properties of the polysiloxanes that are to be used pursuant to the invention, the products of the Examples 1 to 5 are applied on different sheet-like supports (oriented polypropylene film, supercalendered paper) and cured by the action of 1.5 Mrad electron beams. The amount applied in each case is about 1.1 g/m$^2$.

For the comparison tests, different 30 mm wide adhesive tapes were used, namely two adhesive tapes, which are coated with acrylate adhesives and commercially obtainable under the names of Tesa ® 154 and Tesa ® 970, as well as an adhesive tape, which is coated with a rubber adhesive and known in the trade under the name of Tesa ® 969.

To measure the abhesiveness, these adhesive tapes are rolled onto the substrate and subsequently stored at 70° in the case of the acrylate adhesive tapes and at 40° C.

in the case of the rubber adhesive tape. After 24 hours, the force is measured, which is required to pull the adhesive tape from the substrate at a peel angle of 180°. This force is referred to as the release force. In addition, the adhesion of the modified polydimethylsiloxane to the substrate is tested by vigorous rubbing with the thumb. In the event of defective adhesion, rubber-like crumbs are formed (the so-called "rub-off" test).

TABLE

| mod. Siloxane Example | Supercalendered paper | | | | Oriented Polypropylene | | | |
|---|---|---|---|---|---|---|---|---|
| | Tesa ® 154 Release | Tesa ® 970 Force [N] | Tesa ® 969 | Rub off Test | Tesa ® 154 Release | Tesa ® 970 Force [N] | Tesa ® 969 | Rub off Test |
| 1 | 1.0 | 2.0 | 1.8 | no | 0.9 | 1.8 | 1.6 | no |
| 2 | 0.15 | 0.4 | 0.3 | no | 0.1 | 0.3 | 0.3 | no |
| 3 | 3 | 6 | 8 | no | 3 | 4 | 7 | no |
| 4 | 4 | 6 | 6 | no | 2 | 5 | 5 | no |
| 5 | 0.1 | 0.4 | 0.3 | no | 0.05 | 0.2 | 0.2 | no |

It is evident from the Table that the organopolysiloxanes, which are to be used pursuant to the invention, have the desired application properties; they adhere to the coated support, can be cured rapidly on this and show good abhesive properties towards adhesives of chemically different structure.

We claim:

1. In a method of producing an adhesive coating on a substrate by applying a curable organopolysiloxane modified with (meth)acrylate ester groups on the surface of the substrate and curing the modified organopolysiloxane by the action of polymerizing high-energy radiation, the improvement comprising that the curable organopolysiloxane is the reaction product, obtained under esterification conditions of (A) a polysiloxane of the general average formula

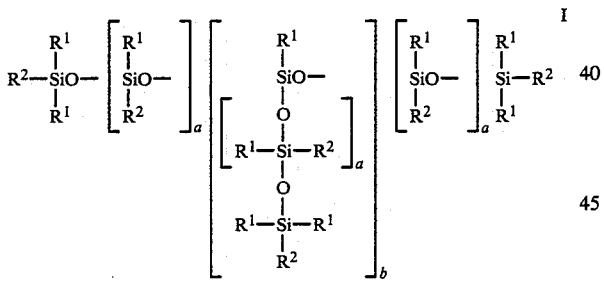

wherein
the $R^1$ groups are the same or different and represent low molecular weight alkyl groups with 1 to 4 carbon atoms or phenyl groups,
the $R^2$ groups being selected from the groups consisting of
(a) hydroxy-functional groups of the formula $-CH_2(CR^3{}_2)_n-(OCH_2CHR^4)_m-OH$, $-CH=CH-CR^3{}_2-OH$ and groups of the formula

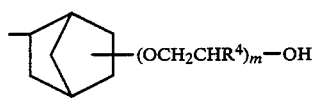

wherein
the $R^3$ groups are the same or different and represent a hydrogen group or an alkyl group with 1 to 4 carbon atoms, the $R^4$ groups being the same or different and representing a hydrogen or alkyl group with 1 to 10 carbon atoms, and
the subscripts
n=0 to 10, and
m=0 to 40,
(b) unsubstituted and substituted alkyl groups with 2 to 20 carbon atoms and hydrogen groups, and
(c) $R^1$ groups, wherein
a has a value of 1 to 1,000, and
b has a value of 0 to 10,
with the proviso that
(i) at least 1.8 hydroxy functional $R^2$ groups (a) are contained in the average molecule,
(ii) the remaining $R^2$ groups are of the species (a), (b) or (c), and
(iii) the lower limit value of the ratio between the hydroxy-functional $R^2$ groups of species (a) and the $R^2$ groups of species (b) is not below 70:30, and
(B) based on hydroxyl groups, 0.4 to 0.9 molar amounts of (meth)acrylic acid and up to 0.6 molar amounts of a monocarboxylic acid, which is free of double bonds capable of polymerizing, the sum of the molar amounts of the acids being not greater than 1.0.

2. A coated substrate comprising
(a) a substrate layer of paper or a film, and
(b) an abhesive coating on said substrate layer and cured on said layer by polymerizing high-energy radiation, said coating being formed of a coating composition essentially consisting of or comprising an effective amount of a curable organopolysiloxane modified with (meth)acrylate ester groups, said organopolysiloxane being the reaction product of
(A) a polysiloxane of the general average formula

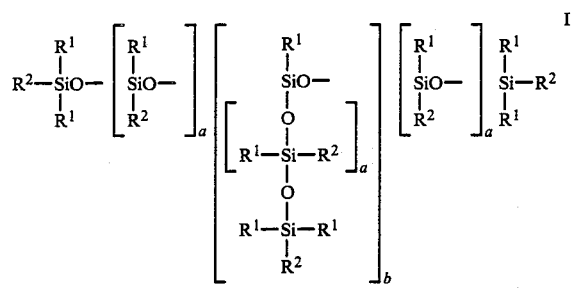

wherein
the $R^1$ groups are the same or different and represent low molecular weight alkyl groups with 1 to 4 carbon atoms or phenyl groups,
the $R^2$ groups being selected from the groups consisting of (a) hydroxy-functional groups of the formula —CH$_2$(CR$^3_2$)$_n$—(OCH$_2$CHR$^4$)$_m$—OH, —CH═CH—CR$^3_2$—OH and groups of the formula

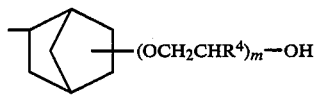

wherein
the R$^3$ groups are the same or different and represent a hydrogen group or an alkyl group with 1 to 4 carbon atoms,
the R$^4$ groups being the same or different and representing a hydrogen or alkyl group with 1 to 10 carbon atoms, and
the subscripts
n=0 to 10, and
m=0 to 40,
(b) unsubstituted and substituted alkyl groups with 2 to 20 carbon atoms and hydrogen groups, and
(c) R$^1$ groups, wherein
a has a value of 1 to 1,000, and
b has a value of 0 to 10,
with the proviso that
(i) at least 1.8 hydroxy functional R$^2$ groups (a) are contained in the average molecule,
(ii) the remaining R$^2$ groups are of the species (a), (b) or (c), and
(iii) the lower limit value of the ratio between the hydroxy-functional R$^2$ groups of species (a) and the R$^2$ groups of species (b) is not below 70:30, and
(B) based on hydroxyl groups, 0.4 to 0.9 molar amounts of (meth)acrylic acid and up to 0.6 molar amounts of a monocarboxylic acid, which is free of double bonds capable of polymerizing, the sum of the molar amounts of the acids being not greater than 1.0.

3. The coated substrate as claimed in claim 2, wherein the curable organopolysiloxane is the reaction product of a polysiloxane of formula I and a mixture of (meth)acrylic acid and a monocarboxylic acid, which is free of double bonds, in such a ratio that all the hydroxyl groups of the polysiloxane of the general formula I are esterified.

4. The coated substrate as claimed in claim 2, wherein the curable organopolysiloxane is the reaction product of a polysiloxane of formula I and a mixture of (meth)acrylic acid and a monocarboxylic acid with 2 to 10 carbon atoms, which is free of double bonds.

5. The coated substrate as claimed in claim 4, wherein the curable organopolysiloxane is the reaction product of a polysiloxane of formula I and a mixture of (meth)acrylic acid and acetic acid.

6. The coated substrate as claimed in claim 2, wherein the curable organopolysiloxane of formula I has a value of for subscript a of 5 to 200 and for subscript b of 0 to 2.

7. The coated substrate as claimed in claim 2, wherein the curable organopolysiloxane of formula I has a value of 0 for subscript b.

8. The coated substrate as claimed in claim 2, wherein the curable organopolysiloxane of formula I comprises R$^1$ groups, of which at least 90% are methyl.

9. The coated substrate as claimed in claim 2, wherein the curable organopolysiloxane of formula I has a value for m=0.

10. The coated substrate as claimed in claim 2, wherein the curable organopolysiloxane of formula I comprises hydroxy-functional R$^2$ groups (a), which are selected from the group consisting of —CH$_2$OH, —(CH$_2$)$_3$OH, —CH$_2$—CH(CH$_3$)CH$_2$OH, —(CH$_2$)$_4$OH, —CH$_2$CH(CH$_3$)CH$_2$—CH$_2$OH, —CH$_2$CH$_2$C(CH$_3$)$_2$OH and CH$_2$CH$_2$C(CH$_3$)HOH.

11. The coated substrate as claimed in claim 2, wherein the curable organopolysiloxane of formula I comprises the R$^2$ groups of species (b) selected from the group consisting of ethyl, propyl, 1-butyl, hexyl, octyl, dodecyl, octadecyl, 2-phenylpropyl and 3-chloropropyl.

* * * * *